United States Patent
Ooishi et al.

(10) Patent No.: US 10,218,626 B2
(45) Date of Patent: Feb. 26, 2019

(54) DATA PROCESSING DEVICE, RECEIVING DEVICE, DATA PROCESSING METHOD, AND PROGRAM WITH DYNAMIC PRIORITY ORDER

(71) Applicant: Sony Corporation, Tokyo (JP)

(72) Inventors: Noriaki Ooishi, Kanagawa (JP); Shinji Negishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 128 days.

(21) Appl. No.: 15/321,090

(22) PCT Filed: Jun. 26, 2015

(86) PCT No.: PCT/JP2015/068450
§ 371 (c)(1),
(2) Date: Dec. 21, 2016

(87) PCT Pub. No.: WO2016/006473
PCT Pub. Date: Jan. 14, 2016

(65) Prior Publication Data
US 2017/0134291 A1    May 11, 2017

(30) Foreign Application Priority Data
Jul. 10, 2014  (JP) ................................ 2014-141979

(51) Int. Cl.
*H04L 12/851* (2013.01)
*H04L 12/833* (2013.01)
(Continued)

(52) U.S. Cl.
CPC ...... *H04L 47/2441* (2013.01); *H04L 47/2458* (2013.01); *H04L 47/6275* (2013.01);
(Continued)

(58) Field of Classification Search
CPC ............ H04L 47/2441; H04L 47/2458; H04L 47/6275; H04N 21/23605;
(Continued)

(56) References Cited

U.S. PATENT DOCUMENTS 5,148,272 A * 9/1992 Acampora ........... H04N 5/4401
                                            348/E5.108
8,484,682 B2 * 7/2013 Inagaki ............... H04N 5/44591
                                            725/44
(Continued)

FOREIGN PATENT DOCUMENTS

JP  2004-241793 A  8/2004
JP  2005-102104 A  4/2005
(Continued)

OTHER PUBLICATIONS

"Digital Video Broadcasting (DVB)," Extensions to the CI Plus Specification, DVB Document A165, Oct. 2013.

*Primary Examiner* — Chi H Pham
*Assistant Examiner* — Weibin Huang
(74) *Attorney, Agent, or Firm* — Michael Best & Friedrich LLP (57) ABSTRACT

The present disclosure relates to a data processing device, a receiving device, a data processing method, and a program that can suppress the occurrence of reproduction faults caused by a reduction in bit rate.
An input packet classifying unit classifies an input packet as a high priority packet or a low priority packet according to priority order based on data included in packets configuring a stream. An output packet selecting unit preferentially selects and outputs a packet of high priority order from among packets that have been classified by the input packet classifying unit and being retained in a high priority packet
(Continued)

FIFO or a low priority packet FIFO. The present technology is applied to, for example, a receiving device that can receive a plurality of streams.

18 Claims, 9 Drawing Sheets

(51) Int. Cl.
  *H04L 12/865* (2013.01)
  *H04N 21/236* (2011.01)
  *H04N 21/2365* (2011.01)
  *H04N 21/2383* (2011.01)
  *H04N 21/434* (2011.01)

(52) U.S. Cl.
  CPC ..... *H04N 21/2365* (2013.01); *H04N 21/2383* (2013.01); *H04N 21/23605* (2013.01); *H04N 21/23611* (2013.01); *H04N 21/4346* (2013.01); *H04N 21/4347* (2013.01)

(58) Field of Classification Search
  CPC ......... H04N 21/23611; H04N 21/2365; H04N 21/2383; H04N 21/4346; H04N 21/4347
  See application file for complete search history.

(56) References Cited

U.S. PATENT DOCUMENTS

| | | | | |
|---|---|---|---|---|
| 8,514,871 | B2* | 8/2013 | Anschutz | H04L 47/10 370/235 |
| 2004/0160971 | A1* | 8/2004 | Krause | H04L 47/10 370/412 |
| 2005/0169181 | A1* | 8/2005 | Kim | H04N 21/23406 370/235 |
| 2007/0053352 | A1* | 3/2007 | Corcoran | H04B 3/54 370/389 |
| 2007/0081563 | A1* | 4/2007 | Seo | H04J 3/0632 370/542 |
| 2009/0013369 | A1* | 1/2009 | Seo | H04N 21/434 725/131 |
| 2009/0172218 | A1* | 7/2009 | Rainho Almeida | H04N 5/765 710/65 |
| 2010/0162337 | A1* | 6/2010 | Lee | H04L 12/2801 725/111 |
| 2012/0281618 | A1* | 11/2012 | Zheng | H04L 12/5601 370/328 |

FOREIGN PATENT DOCUMENTS

JP 2007-282023 A 10/2007
JP 2014-007476 A 1/2014

* cited by examiner

| PRIORITY | SERVICE |
|---|---|
| 1 | REAL-TIME SERVICE (LIVE BROADCASTING) |
| 2 | NON-REAL-TIME SERVICE (STREAMING BROADCASTING) |
| 3 | NON-REAL-TIME SERVICE (DOWNLOAD BROADCASTING) |

B

| PRIORITY | ELEMENTARY STREAM |
|---|---|
| 1 | PCR |
| 2 | CHANNEL SELECTION INFORMATION |
| 3 | AUDIO (SUB AUDIO); CURRENTLY SELECTED BY USER |
| 4 | VIDEO |
| 5 | AUDIO (MAIN AUDIO); CURRENTLY NOT SELECTED BY USER |
| 6 | OTHERS (SUBTITLE, CLOSED CAPTION, AND THE LIKE) |

C

| PRIORITY | CLASSIFICATION OF CONFIGURATION DATA (EXAMPLE OF VIDEO STREAM) |
|---|---|
| 1 | HEADER INFORMATION (Parameter Set) |
| 2 | ENTRY POINT (IDR Picture) |
| 3 | OTHERS (SUCH AS Picture OTHER THAN IDR) |

FIG. 6

| valid_flag (1 bits) | PID (13 bits) | priority (2 bits) |
|---|---|---|
| 1 | 0x400 | 0 |
| 1 | 0x200 | 1 |
| 1 | 0x100 | 1 |
| 1 | 0x300 | 2 |
| 1 | 0x800 | 2 |
| 0 | 0x600 | 2 |
| 1 | 0x500 | 3 |
| 1 | 0x900 | 3 |

FIG. 9

DATA PROCESSING DEVICE, RECEIVING DEVICE, DATA PROCESSING METHOD, AND PROGRAM WITH DYNAMIC PRIORITY ORDER

TECHNICAL FIELD

The present disclosure relates to a data processing device, a receiving device, a data processing method, and a program. The present disclosure particularly relates to a data processing device, a receiving device, a data processing method, and a program capable of suppressing an occurrence of reproduction faults caused by a reduction in bit rate.

BACKGROUND ART

Conventionally, in fields of digital broadcasting, network distribution, content recording, and the like, data of video, audio, and others are each packetized and then multiplexed with a format that is capable of synchronous reproduction. Thereafter, the data is transmitted or stored. Moving Picture Experts Group-2 Transport Stream (MPEG-2 TS), and the like are known as multiplexed streams obtained by multiplexing data of video, audio, and others, as mentioned above.

A multiplexed stream is generally configured from a plurality of services (programs). Therefore, when a plurality of services is transmitted or stored as it is, a larger transmission band or storage capacity is respectively needed than when a single service is transmitted or stored.

Accordingly, in the related art, a bit rate of a multiplexed stream is reduced by filtering with which only packets included in intended services are selected from among a plurality of services.

Chapter 6 in Non-patent Document 1 discloses a technology related to multistream reception for receiving a plurality of multiplexed streams. To be more specific, filtering is performed by arranging PID selection units that select packets in accordance with packet IDs (PID) for identifying packets, for respective input transport streams (TSs) provided from respective demodulation units that demodulate a plurality of multiplexed streams. Thereafter, packets having intended PIDs are extracted (other packets are discarded) by the PID selection units. Then, partial TSs each configured from a single service are generated, and the plurality of partial TSs is multiplexed in a TS multiplexer.

For example, Patent Document 1 discloses a stream reception method that can reduce a bit rate of a multiplexed stream by performing such filtering.

CITATION LIST

Patent Document

Patent Document 1: Japanese Patent Application Laid-Open No. 2014-7476

Non-Patent Document

Non-patent Document 1: Digital Video Broadcasting (DVB); Extensions to the CI Plus Specification, [online], DVB Document A165, October 2013, searched on the Internet on Jun. 23, 2014.
<URL:http://www.dvb.org/resources/public/standards/a165_dvb-ci-plus_v_1_4.pdf>

SUMMARY OF THE INVENTION

Problems to be Solved by the Invention

Incidentally, when a bit rate is still high for a transmission band or storage capacity even after such filtering mentioned above has been performed, excess packets are discarded regardless of the content thereof because it is impossible to transmit or store all the packets. Therefore, when packets needed for reproducing video, audio, and others are discarded due to a reduction in bit rate, reproduction faults such as blocknoise and strange noise may occur in a case of reproducing video, audio, and others. Note that in Patent Document 1, a solution to occurrence of such reproduction faults is not mentioned.

The present disclosure has been made in view of the above situations, and can suppress the occurrence of reproduction faults caused by a reduction in bit rate.

Solutions to Problems

A data processing device of one aspect of the present disclosure includes a classifying unit and a selection unit. The classifying unit classifies packets configuring a stream in accordance with priority order based on data included in the packets. The selection unit preferentially selects and outputs the packets of the high priority from among the packets that have been classified by the classifying unit.

A data processing method or a program of one aspect of the present disclosure includes the steps of classifying packets configuring a stream in accordance with priority order based on data included in the packets, and preferentially selecting and outputting the packets of the high priority order from among the packets that have been classified.

In one aspect of the present disclosure, packets configuring a stream are classified in accordance with priority order based on data included in the packets, and the packets of the high priority order are preferentially selected and output from among the packets that have been classified.

EFFECTS OF THE INVENTION

According to one aspect of the present disclosure, an occurrence of reproduction faults caused by a reduction in bit rate can be suppressed.

MODE FOR CARRYING OUT THE INVENTION

Hereinafter, specific embodiments to which the present technology is applied will be described in detail with reference to the drawings.

Figure 1:
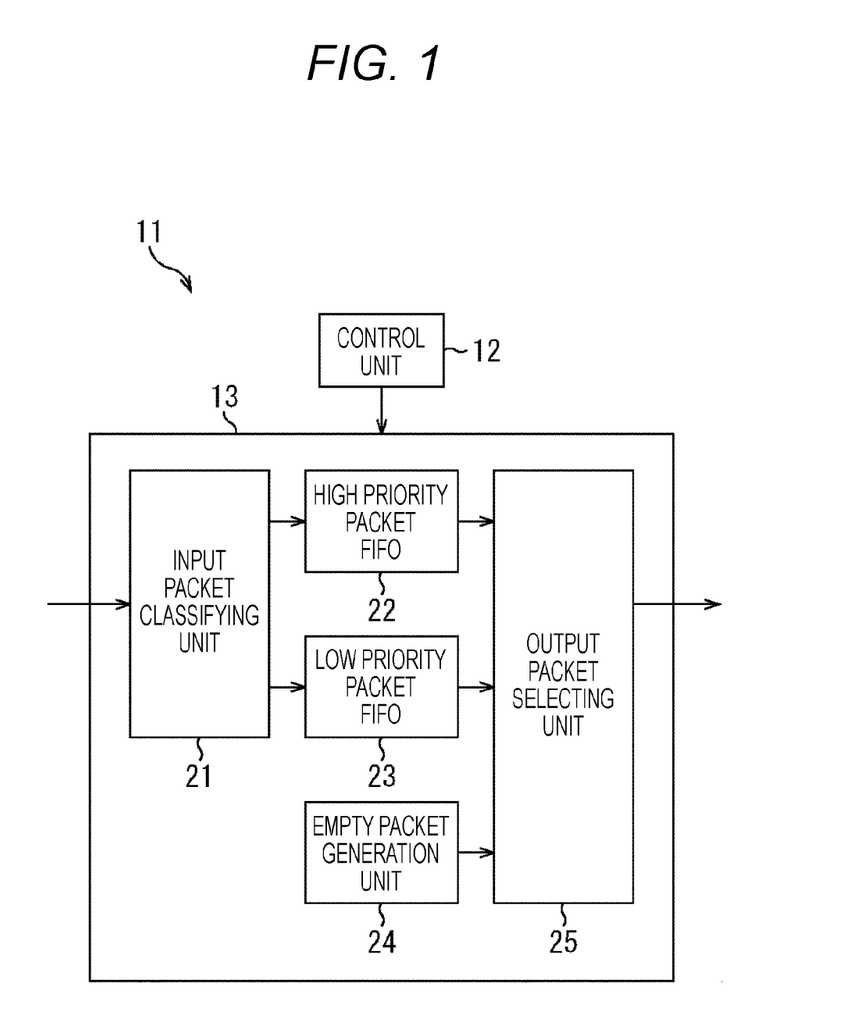
FIG. 1 is a block diagram showing an exemplary configuration of one embodiment of a data processing device to which the present technology is applied.

FIG. 1 is a block diagram showing an exemplary configuration of one embodiment of a data processing device to which the present technology is applied.

A data processing device 11 shown in FIG. 1 is used by being built into, for example, a receiving device that receives a multiplexed stream transmitted in accordance with a digital television broadcasting standard.

For example, in the receiving device, a multiplexed stream is acquired by demodulating broadcasting waves received by an antenna. Packets that configure the multiplexed stream are input to the data processing device 11. Then, packets that are output after having been processed in the data processing device 11 are decoded in a latter decoder. The decoded video data is output to a display and audio data is output to a speaker.

As shown in FIG. 1, the data processing device 11 includes a control unit 12 and a bit rate adjusting unit 13.

The control unit 12 controls the bit rate adjusting unit 13 in accordance with a standard of a multiplexed stream that the receiving device receives, or an operation on the receiving device by a user (for example, an operation to select a channel, to switch between main audio and sub audio, and so on). For example, as will be mentioned below with reference to FIGS. 5 and 6, the control unit 12 supplies, to the bit rate adjusting unit 13, priority order information indicating priority order based on data included in packets, and causes the bit rate adjusting unit 13 to perform processing in accordance with the priority order information. Here, an example will be described in which priority order of a packet is set as a high priority packet that includes data necessary for reproducing video and audio, or as a low priority packet that has lower priority order than the high priority packet.

The bit rate adjusting unit 13 adjusts bit rate, for example, by classifying and selecting a packet input from a preceding demodulation unit not shown (hereinafter, referred to as an input packet), in accordance with control from the control unit 12. Thereafter, a packet output after a bit rate thereof is adjusted in the bit rate adjusting unit 13 (hereinafter, referred to as an output packet) is supplied to, for example, a latter decoder not shown.

Also, the bit rate adjusting unit 13 includes an input packet classifying unit 21, a high priority packet first in, first out (FIFO) 22, a low priority packet FIFO 23, an empty packet generation unit 24, and an output packet selecting unit 25.

The input packet classifying unit 21 classifies the input packet to a high priority packet or a low priority packet in accordance with the priority order information supplied from the control unit 12, and supplies the high priority packet to the high priority packet FIFO 22 and the low priority packet to the low priority packet FIFO 23. Note that the input packet classifying unit 21 discards an input packet that is classified as neither the high priority packet nor the low priority packet, an input packet that is classified as the low priority packet while the low priority packet FIFO 23 is full, and the like.

The high priority packet FIFO 22 temporarily retains a high priority packet that has been supplied from the input packet classifying unit 21. Thereafter, the high priority packet FIFO 22 supplies the high priority packet to the output packet selecting unit 25 in order of being supplied from the input packet classifying unit 21 in response to a request from the output packet selecting unit 25.

The low priority packet FIFO 23 temporarily retains a low priority packet that has been supplied from the input packet classifying unit 21. Thereafter, the low priority packet FIFO 23 supplies the low priority packet to the output packet selecting unit 25 in order of being supplied from the input packet classifying unit 21 in response to a request from the output packet selecting unit 25.

The empty packet generation unit 24 generates and supplies an empty packet (that is, a packet that does not include data) to the output packet selecting unit 25 in response to a request therefrom. An empty packet is generated in the empty packet generation unit 24 in order to fix a bit rate of a stream output from the bit rate adjusting unit 13, for example, when a latter decoder of the bit rate adjusting unit 13 is configured to perform processing with a fixed bit rate.

The output packet selecting unit 25 selects and outputs, as an output packet, any of a high priority packet retained in the high priority packet FIFO 22, a low priority packet retained in the low priority packet FIFO 23, and an empty packet generated in the empty packet generation unit 24. The output packet selecting unit 25, for example, preferentially selects a high priority packet when the high priority packet is being retained in the high priority packet FIFO 22, and selects a low priority packet when the high priority packet is not being retained in the high priority packet FIFO 22. Note that the output packet selecting unit 25 selects an empty packet when the high priority packet FIFO 22 and the low priority packet FIFO 23 are both empty.

The data processing device 11 is configured as above. The bit rate adjusting unit 13 can suppress a high priority packet or a low priority packet being discarded by discarding, in accordance with priority order set by the control unit 12, an input packet that is neither a high priority packet nor a low priority packet when a bit rate of a stream is reduced. Also, the bit rate adjusting unit 13 preferentially outputs a high priority packet over a low priority packet.

Here, the data processing device 11 can suppress an occurrence of faults such as blocknoise and strange noise in a case of reproducing video and audio even when a bit rate is reduced, for example, by setting, as a high priority packet, a packet including data necessary for reproducing video and audio. Also, by reducing a bit rate in the data processing device 11, for example, design of large scale integration (LSI) can be made easy as a result of relaxing a specification of a receiving device that includes the data processing device 11. Also, a cost for connection between devices can also be lowered, and a cost in terms of a system configuration can be reduced.

Next, there will be described input packet classification processing with reference to the flowchart in FIG. 2, in which processing the input packet classifying unit 21 classifies an input packet in accordance with control from the control unit 12. The processing starts, for example, once the receiving device including the data processing device 11 starts receiving a multiplexed stream.

In step S11, the input packet classifying unit 21 determines whether there is an input packet, and stands by for the processing until it is determined that there is an input packet. Thereafter, the input packet classifying unit 21 determines that there is an input packet, for example, when a packet is supplied from a preceding demodulation unit not shown, and the processing proceeds to step S12.

In step S12, the input packet classifying unit 21 acquires, as an input packet, the packet that has been supplied from a preceding demodulation unit not shown.

In step S13, the input packet classifying unit 21 determines whether priority order of the input packet acquired in step S12 has been set to a high priority, in other words, determines whether the input packet is a high priority packet. Thereafter, when the input packet classifying unit 21 determines in step S13 that priority order of the input packet has been set to a high priority, the processing proceeds to step S14.

In step S14, the input packet classifying unit 21 supplies, as a high priority packet, the input packet that has been determined to be set to a high priority in step S13 to the high priority packet FIFO 22.

On the other hand, when the input packet classifying unit 21 determines in step S13 that the priority order of the input packet has not been set to a high priority, in other words, determines the input packet as not a high priority packet, the processing proceeds to step S15. In step S15, the input packet classifying unit 21 determines whether the priority order of the input packet acquired in step S12 has been set to a low priority, in other words, determines whether the input packet is a low priority packet.

When the input packet classifying unit 21 determines in step S15 that the priority order of the input packet acquired in step S12 has been set to a low priority, the processing proceeds to step S16.

In step S16, the input packet classifying unit 21 determines whether the low priority packet FIFO 23 is filled with low priority packets. For example, when as many low priority packets as can be retained in the low priority packet FIFO 23 are already retained in the low priority packet FIFO 23, the input packet classifying unit 21 determines that the low priority packet FIFO 23 is filled with low priority packets.

When the input packet classifying unit 21 determines in step S16 that the low priority packet FIFO 23 is not filled with low priority packets, the processing proceeds to step S17. In step S17, the input packet classifying unit 21 supplies, as a low priority packet, the input packet that has been determined to be set to a low priority as priority order in step S15, to the low priority packet FIFO 23.

On the other hand, the processing proceeds to step S18, when the input packet classifying unit 21 determines in step S15 that an input packet acquired in step S12 has not been set to a low priority or when the input packet classifying unit 21 determines in step S16 that the low priority packet FIFO 23 is filled with low priority packets.

In step S18, the input packet classifying unit 21 discards the input packet that has been acquired in step S12. To be specific, in this case, the input packet is discarded because the input packet is neither a high priority packet nor a low priority packet, or because the input packet is a low priority packet but the low priority packet FIFO 23 cannot retain the low priority packet.

After the processing in step S14, step S17, or step S18, the processing proceeds to step S19. The input packet classifying unit 21 confirms with the control unit 12 to determine whether inputting of packets to the bit rate adjusting unit 13 has finished.

When the input packet classifying unit 21 determines in step S19 that inputting of packets to the bit rate adjusting unit 13 has not finished, the processing returns to step S11, and similar processing will be repeated for the next input packet. On the other hand, when the input packet classifying unit 21 determines in step S19 that inputting of packets to the bit rate adjusting unit 13 has finished, the input packet classification processing will be finished.

As mentioned above, a high priority packet or a low priority packet being discarded can be suppressed when a bit rate of a stream is reduced, by the input packet classifying unit 21 discarding an input packet that is neither a high priority packet nor a low priority packet in the bit rate adjusting unit 13.

Figure 3:
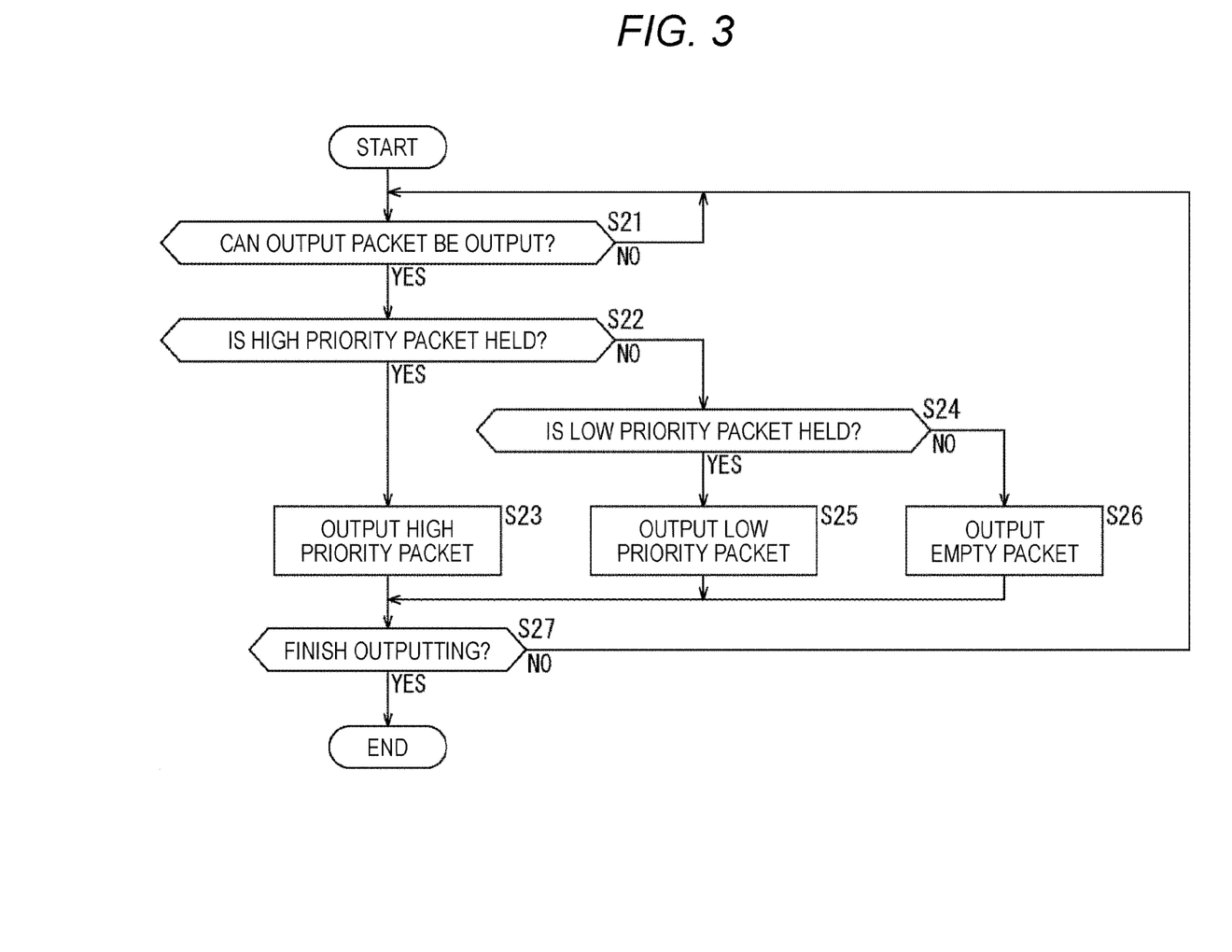
FIG. 3 is a flowchart describing output packet selection processing.

Next, there will be described output packet selection processing with reference to the flowchart in FIG. 3, in which processing the output packet selecting unit 25 selects an output packet in accordance with control from the control unit 12. The processing starts, for example, once the receiving device including the data processing device 11 starts receiving a multiplexed stream.

In step S21, the output packet selecting unit 25, for example, determines whether an output packet can be output on the basis of a processing state of a latter TS multiplexer (refer to FIG. 7), and stands by for the processing until the output packet selecting unit 25 determines that the output packet can be output. The output packet selecting unit 25 determines that an output packet can be output, for example, when the latter TS multiplexer is processing a stream having a bit rate equal to or lower than a bit rate processable in the TS multiplexer.

When the output packet selecting unit 25 determines in step S21 that an output packet can be output, the processing proceeds to step S22. In step S22, the output packet selecting unit 25 determines whether a high priority packet has been retained in the high priority packet FIFO 22.

When the output packet selecting unit 25 determines in step S22 that a high priority packet has been retained in the high priority packet FIFO 22, the processing proceeds to step S23. Thereafter, in step S23, the output packet selecting unit 25 requests the high priority packet to the high priority packet FIFO 22, and outputs, as an output packet, the high priority packet supplied from the high priority packet FIFO 22.

On the other hand, when the output packet selecting unit 25 determines in step S22 that a high priority packet has not been retained in the high priority packet FIFO 22, the processing proceeds to step S24. Thereafter, in step S24, the output packet selecting unit 25 determines whether a low priority packet has been retained in the low priority packet FIFO 23.

When the output packet selecting unit 25 determines in step S24 that a low priority packet has been retained in the low priority packet FIFO 23, the processing proceeds to step S25. Thereafter, in step S25, the output packet selecting unit 25 requests the low priority packet to the low priority packet FIFO 23, and outputs, as an output packet, the low priority packet supplied from the low priority packet FIFO 23.

On the other hand, when the output packet selecting unit 25 determines in step S24 that a low priority packet has not been retained in the low priority packet FIFO 23, the processing proceeds to step S26. Thereafter, in step S26, the output packet selecting unit 25 requests an empty packet to the empty packet generation unit 24, and outputs, as an output packet, the empty packet supplied from the empty packet generation unit 24.

After the processing in step S23, step S25, or step S26, the processing proceeds to step S27. The output packet selecting unit 25 confirms with the control unit 12 to determine whether to finish outputting of packets from the bit rate adjusting unit 13.

When the output packet selecting unit 25 determines, in step S27, not to finish outputting of packets from the bit rate adjusting unit 13, the processing returns to step S21, and similar processing will be repeated for the next output packet. On the other hand, when the output packet selecting unit 25 determines, in step S27, to finish outputting of packets from the bit rate adjusting unit 13, the output packet selection processing will be finished.

As mentioned above, in the bit rate adjusting unit 13, an occurrence of reproduction faults can be suppressed when reproducing video, audio, and the like by the output packet selecting unit 25 preferentially outputting a high priority packet over a low priority packet. Also, by classifying a high priority packet and a low priority packet in the input packet classifying unit 21, selection of an output packet by the output packet selecting unit 25 is made easy.

An example of processing a multiplexed stream by the bit rate adjusting unit 13 will be described with reference to FIG. 4.

Figure 4:
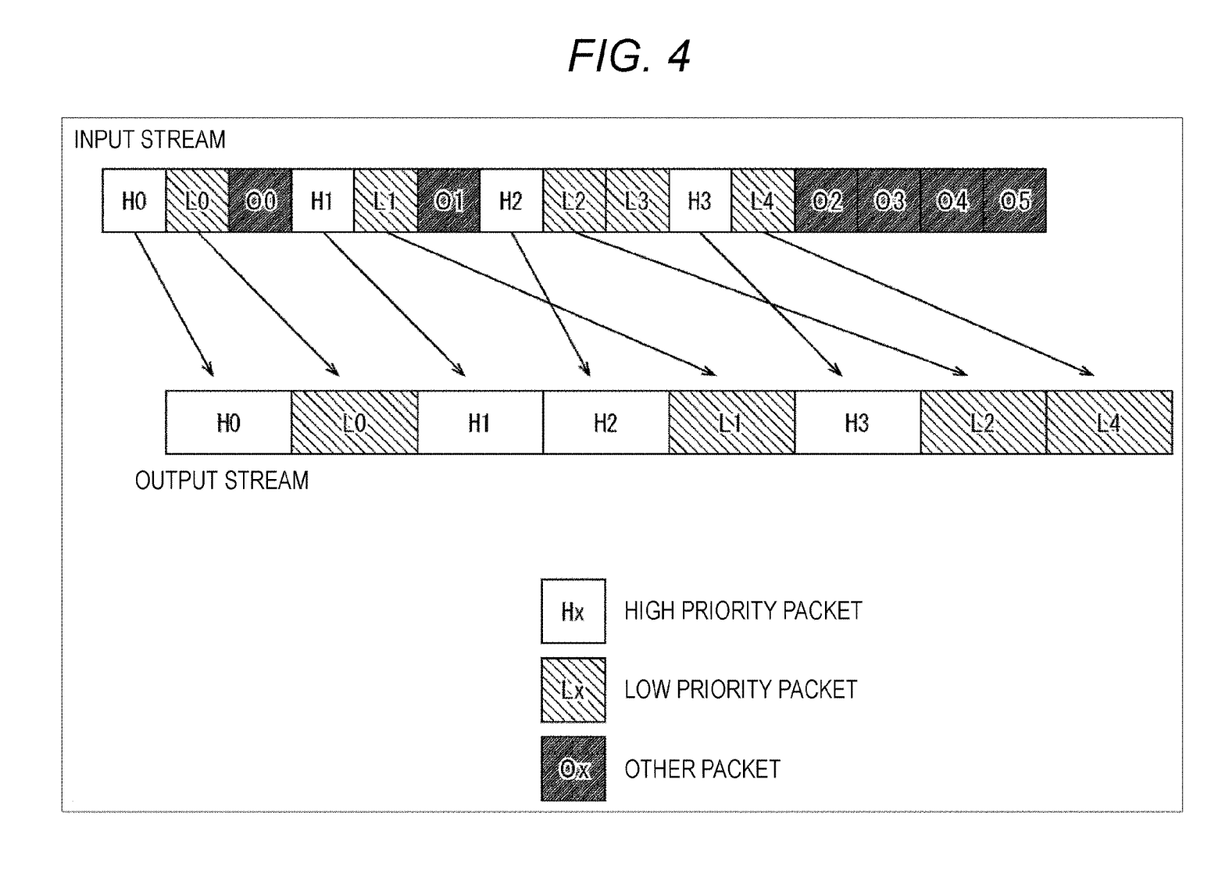
FIG. 4 is a diagram describing an example of processing a multiplexed stream.

An upper part of FIG. 4 shows a packet arrangement of an input stream input to the bit rate adjusting unit 13. A lower part of FIG. 4 shows a packet arrangement of an output stream output from the bit rate adjusting unit 13.

In the example shown in FIG. 4, a ratio (band ratio) between a bit rate of the input stream and a bit rate of the output stream is 2:1. For example, when the bit rate of the input stream is 100 Mbps, the bit rate of the output stream is 50 Mbps. Also, the sizes of the high priority packet FIFO 22 and the low priority packet FIFO 23 are both equivalent to two packets. Furthermore, determinations of whether a high priority packet is being retained in the high priority packet FIFO 22 in step S22 in FIG. 3, and whether a low priority packet is being retained in the low priority packet FIFO 23 in step S24 in FIG. 3 are made under a condition that at least one packet is being retained.

As described with reference to the flowchart in FIG. 3, a high priority packet is preferentially output over a low priority packet. As a result, as shown in FIG. 4, high priority packets are included, without any omission thereof, in an output stream in this example. Also, a high priority packet H2 is preferentially output over a low priority packet L1 as shown in the drawing. Packets in the output stream are output in different order from packets in the input stream.

Figure 2:
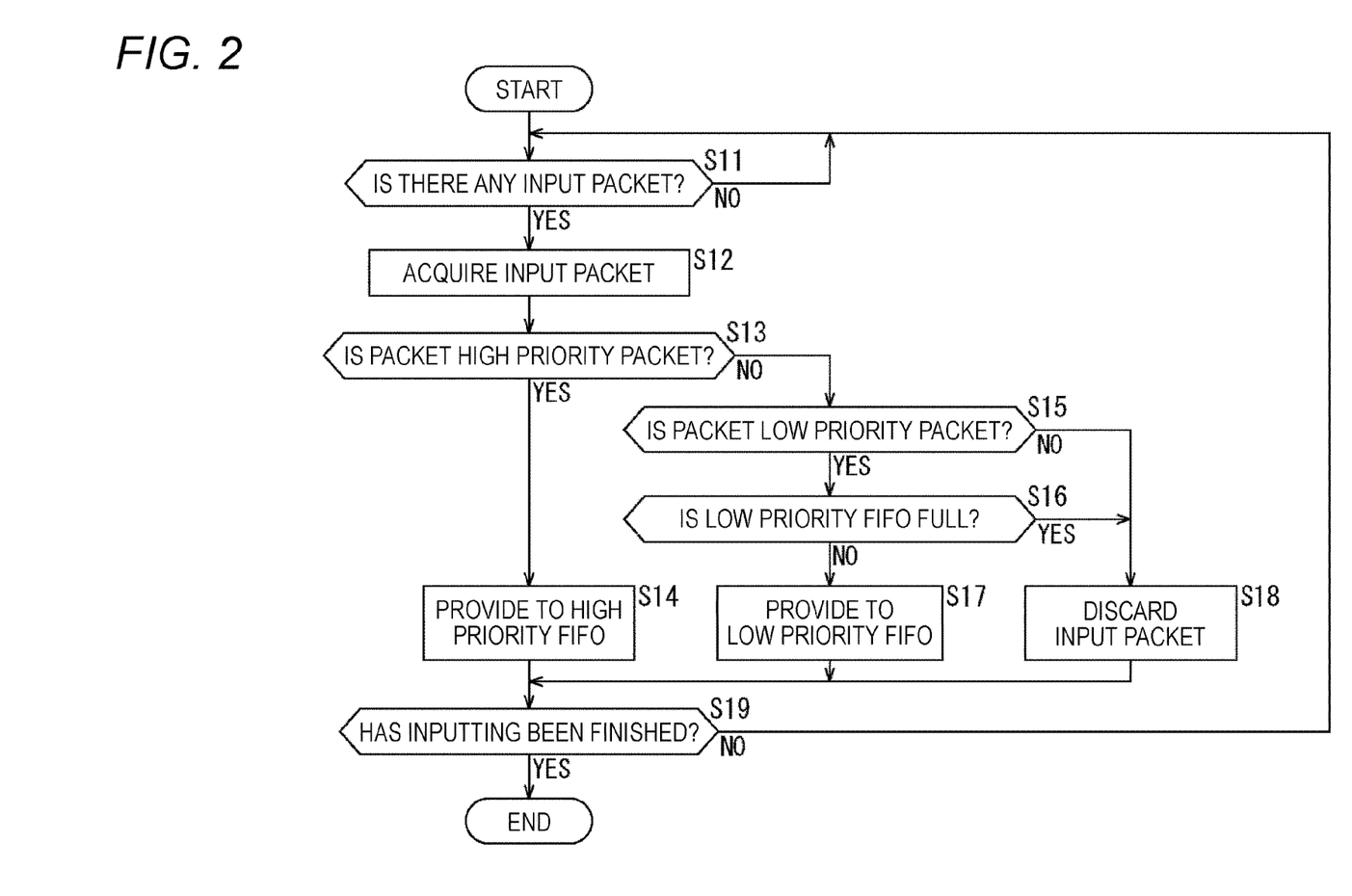
FIG. 2 is a flowchart describing input packet classification processing.

Note that since low priority packets L1 and L2 are already retained in the low priority packet FIFO 23 at the timing when a low priority packet L3 is input, the low priority packet FIFO 23 is determined as full in step S16 in FIG. 2. As a result, the low priority packet L3 is discarded. Note that another packet that is neither a high priority packet nor a low priority packet is discarded and is not included in an output stream. Note that high priority packets and low priority packets are continuously output in the example in FIG. 4. Therefore, an empty packet is not included in the output stream because there is no room for an empty packet to be output.

The processing is performed such that a high priority packet is preferentially output in a case of halving a bit rate.

Note that priority order of a packet set to the bit rate adjusting unit 13 is not limited to two, i.e., a high priority packet and a low priority packet, as mentioned above. More priority order can be set. For example, the control unit 12 can set the priority order on the basis of services received by the receiving device, elementary streams of a service, classification of configuration data, and the like. Note that the priority order may be a fixed value or may dynamically be changed depending on an input stream, a use case, a viewing condition of a user, and the like.

Figure 5:
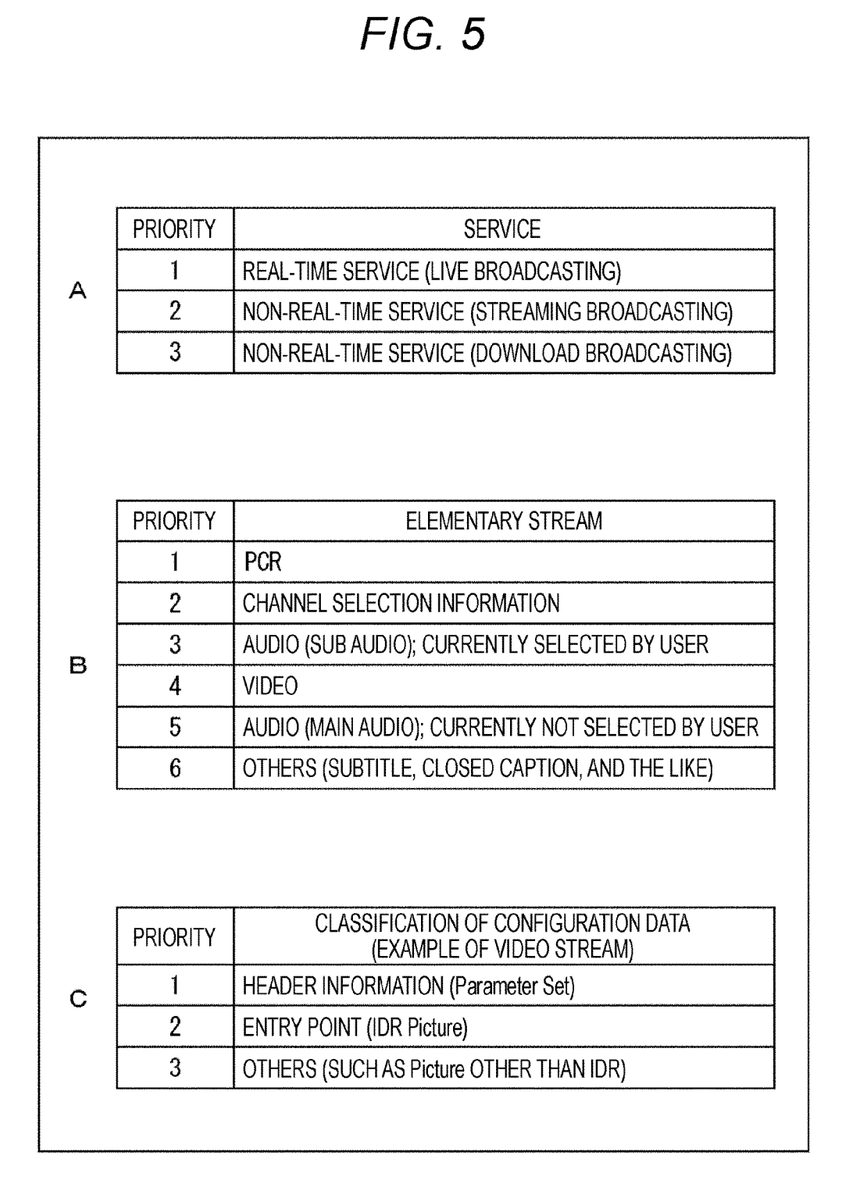
FIG. 5 is a diagram showing an example of priority order for classifying an input packet.

An example of priority order for classifying an input packet in the bit rate adjusting unit 13 is shown in FIG. 5.

As shown in A of FIG. 5, for example, when a receiving device is receiving a plurality of services (partial TSs), the control unit 12 sets priority order on the basis of a type of each of the services, and controls the bit rate adjusting unit 13.

For example, a real-time service such as live broadcasting has small tolerable jitter compared with a non-real-time service. Therefore, priority order of a real-time service is set to the highest. Also, among non-real-time services, streaming broadcasting has small tolerable jitter compared with download broadcasting. Therefore, priority order of streaming broadcasting is set higher than that of download broadcasting.

In addition, as shown in B of FIG. 5, the control unit 12 sets priority order for each elementary stream of a service and controls the bit rate adjusting unit 13.

For example, program clock reference (PCR) has extremely small tolerable jitter. Therefore, priority order of PCR is set to the highest. Note that channel selection information is essential for selecting a service. Therefore, priority order of channel selection information is set higher than those of video, audio, and the like. Note that audio faults are conspicuous when audio is not reproduced properly, compared with when video is not reproduced properly. Therefore, priority order of audio is set higher than that of video. Here, priority order of audio, currently selected by a user between main audio and sub audio (sub audio in the example in FIG. 3), is set higher than that of video. The priority order of audio, currently not selected by the user (main audio in the example in FIG. 3), is set lower than that of video. In addition, priority order of, for example, a subtitle and closed caption other than PCR, channel selection information, audio and video are set to the lowest.

In addition, as shown in C of FIG. 5, the control unit 12 sets priority order for each classification of configuration data and controls the bit rate adjusting unit 13.

In a case of a video stream for example, header information (parameter set) is essential for decoding the video stream. Therefore, priority order of a parameter set is set to the highest. Note that an entry point (IDR picture) can be decoded alone. Therefore, an IDR picture is distinguished from other data (for example, a picture other than an IDR) and priority order of an IDR picture is set high.

Figure 6:
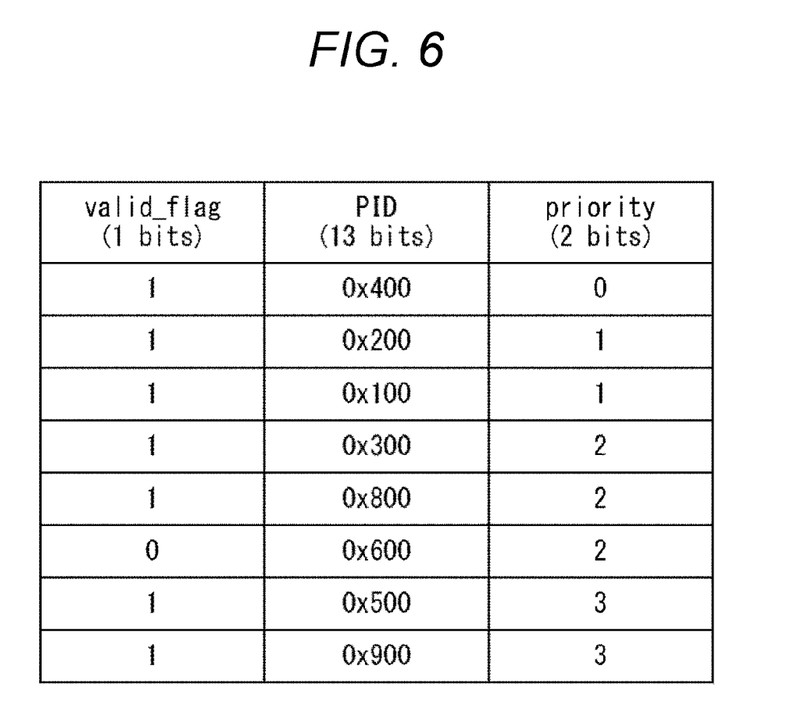
FIG. 6 is a diagram showing an example of priority order information.

In addition, the control unit 12 supplies priority order information, as is shown in FIG. 6, to the bit rate adjusting unit 13 for control thereof to perform processing in priority order as described with reference to FIG. 5.

In an example shown in FIG. 6, priority order information includes eight information entries, and the entries each include three information elements, i.e., one-bit valid flag (valid_flag), 13-bit PID, and two-bit priority order (priority).

The valid flag is a flag that indicates validity or invalidity of each entry. An entry in which "1" is set for the valid flag is interpreted. An entry in which "0" is set for the valid flag is ignored. In the example in FIG. 6, seven entries, i.e., first to fifth and seventh and eighth entries are set valid.

PID indicates identifiers for identifying packets of each entry. Priority indicates priority order of each entry. The lower the value is, the higher the priority order is. In the example in FIG. 6, priority order "0" indicates the highest priority, and priority order "3" indicates the lowest priority. For example, priority order of a packet identified as a PID "0x400" is set to the highest, and priority order of packets identified as PIDs "0x500" and "0x900" is set to the lowest.

In the data processing device 11, such priority order information is provided from the control unit 12 to the input packet classifying unit 21 in the bit rate adjusting unit 13. Thereafter, the input packet classifying unit 21 identifies a packet in accordance with a PID of an entry in which the valid flag is set to "1", and classifies an input packet on the basis of priority order corresponding to each PID.

Note that, in the priority order information, fixed information entries and each fixed information element may be used. Also, for example, information entries and each information element may dynamically be changed depending on an input stream, a use case, a viewing condition of a user, and the like. In addition, in a case of changing information entries and each information element, each entry can independently be changed, or all the entries can simultaneously be changed.

For example, information entries and each information element may dynamically be changed depending on an occurrence of a fault in reproduction. For example, when a decoding error occurs in reproduction of video or audio, priority order of an entry including data that has caused the decoding error may be changed to be higher. As a result, an occurrence of a fault can be suppressed.

Note that the same priority can be set to different entries. Note that priorities may be designated to have a deviation among all the entries.

Note that the example in which eight information entries are included in the priority order information shown in FIG. 6 has been described. However, the number of information entries can be seven or less, or nine or more, and has no upper limit. Also, four levels of priority order from "0" to "3" have been described for the priority order information shown in FIG. 6. However, the number of levels of priority order can be three or less, or five or more, and has no upper limit. Also, indication of the priority order is not limited to the case where the lower the value is, the higher the priority is. The priority order may indicate that the higher the value is, the higher the priority is. In addition, an order of information entries is not limited to the case of being arranged in ascending order in accordance with priority order as shown in FIG. 6. The arrangement may be in any order.

Figure 7:
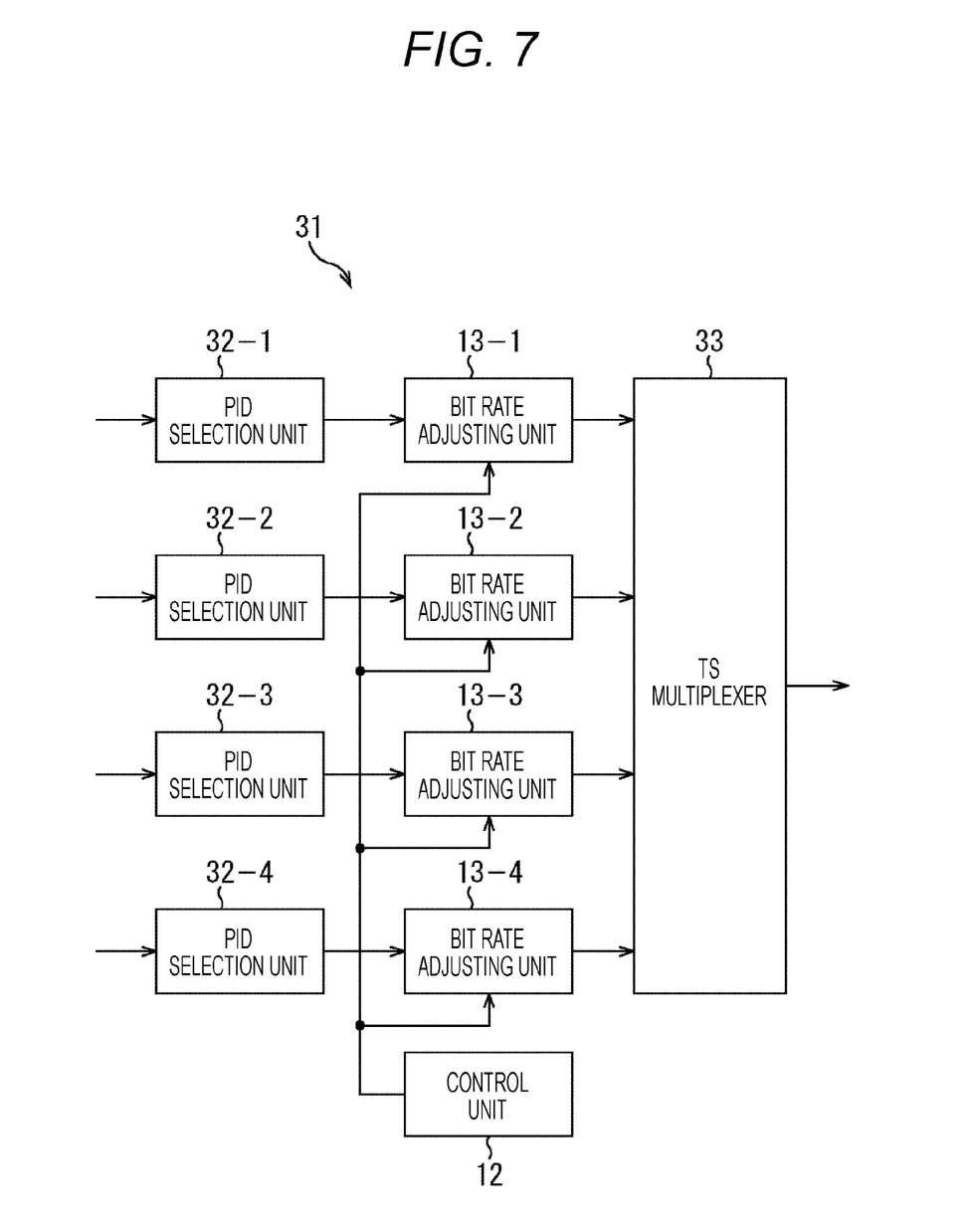
FIG. 7 is a block diagram showing an exemplary configuration of a data processing device including a bit rate adjusting unit for each of a plurality of streams.

Next, FIG. 7 is a block diagram showing an exemplary configuration of a data processing device including a bit rate adjusting unit 13 for each of a plurality of streams.

A data processing device 31 shown in FIG. 7 can be installed on a receiving device that receives a multistream complying with DVB-CI Plus standard described in above Non-patent Document 1. In FIG. 7, an exemplary configuration that receives four streams is shown.

As shown in FIG. 7, the data processing device 31 includes the control unit 12, four bit rate adjusting units 13-1 to 13-4, four PID selection units 32-1 to 32-4, and a TS multiplexer 33. For example, packets are directly supplied from the PID selection units 32-1 to 32-4 to the TS multiplexer 33 in the related art. Compared with this, the data processing device 31 is arranged to have the bit rate adjusting units 13-1 to 13-4 for the respective PID selection units 32-1 to 32-4 between the PID selection units 32-1 to 32-4 and the TS multiplexer 33. A bit rate is adjusted for each of the four streams (services).

The control unit 12 controls the bit rate adjusting units 13-1 to 13-4 similarly to the control unit 12 in FIG. 1.

Multiplexed streams obtained by multiplexing a plurality of streams are supplied to the PID selection units 32-1 to 32-4. The PID selection units 32-1 to 32-4 select packets that configure corresponding respective services in accordance with PIDs. To be specific, the PID selection units 32-1 to 32-4 discard packets other than those that configure corresponding one service from the multiplexed streams. As a result, partial TSs that are reconfigured from a single service are generated. Thereafter, the PID selection units 32-1 to 32-4 respectively supply the packets selected in accordance with PIDs to the bit rate adjusting units 13-1 to 13-4.

The bit rate adjusting units 13-1 to 13-4 perform such input packet classification processing and output packet selection processing mentioned above to the partial TSs, configured from packets, output from the corresponding respective PID selection units 32-1 to 32-4. As a result, the bit rate adjusting units 13-1 to 13-4 reduce bit rates of the corresponding respective partial TSs, and each supply output packets to the TS multiplexer 33.

The TS multiplexer 33 multiplexes four partial TSs supplied from the bit rate adjusting units 13-1 to 13-4. The TS multiplexer 33 supplies the multiplexed four partial TSs, for example, to a decoder LSI via a CI module (not shown) that complies with DVB-CI Plus standard.

In the data processing device 31 configured as mentioned above, a bit rate is reduced in each of the bit rate adjusting units 13-1 to 13-4. As a result, multiplex processing in the TS multiplexer 33 can be made easy. Also, when the TS multiplexer 33 performs multiplex processing, a possibility of the high priority packet being discarded is suppressed even when the bit rate is equal to or higher than a bit rate processable in the TS multiplexer 33. As a result, an occurrence of reproduction faults can be suppressed.

Note that the data processing device 31 can be applied to, for example, multistream reception complying with DVB-CI Plus standard and general multiplex processing in which a plurality of multiplexed streams is input.

Figure 8:
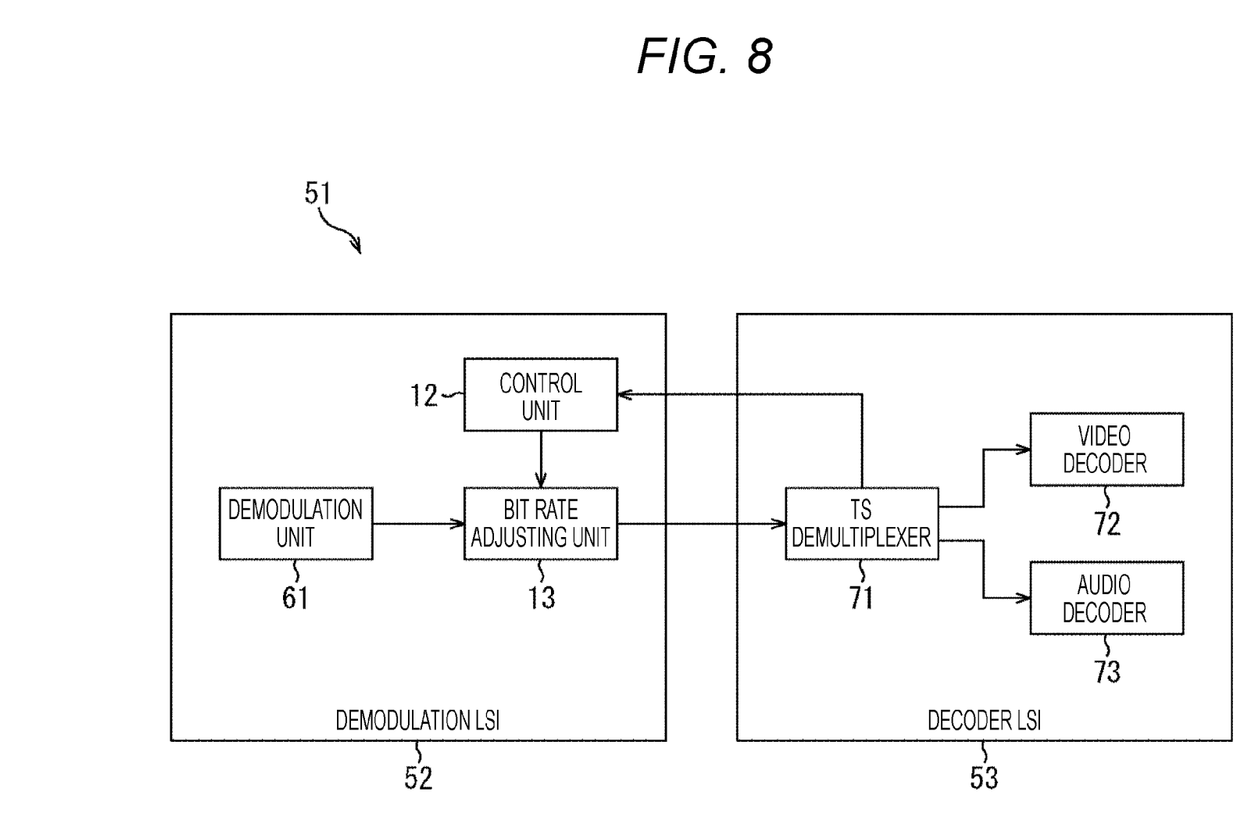
FIG. 8 is a block diagram showing an exemplary configuration of a receiving device.

Next, FIG. 8 is a block diagram showing an exemplary configuration of a receiving device (digital broadcasting receiving system) including the bit rate adjusting unit 13 in FIG. 1.

As shown in FIG. 8, the receiving device 51 includes a demodulation LSI 52 and a decoder LSI 53. The bit rate adjusting unit 13 is built into the demodulation LSI 52.

The demodulation LSI 52 includes a demodulation unit 61, the control unit 12, and the bit rate adjusting unit 13. Broadcasting waves received by an antenna not shown are supplied to the demodulation unit 61. The demodulation unit 61 acquires a multiplexed stream, obtained by multiplexing a plurality of streams, by demodulating the broadcasting waves. The demodulation unit 61 supplies packets that configure the multiplexed stream to the bit rate adjusting unit 13.

The decoder LSI 53 includes a TS demultiplexer 71, a video decoder 72, and an audio decoder 73.

A multiplexed stream output from the bit rate adjusting unit 13 is supplied to the TS demultiplexer 71. Thereafter, the TS demultiplexer 71 demultiplexes the multiplexed stream, and supplies, among streams of services to be reproduced, a video stream to the video decoder 72 and an audio stream to the audio decoder 73. As a result, the video decoder 72 decodes the video and causes a display unit to display the video, and the audio decoder 73 decodes the audio and causes a speaker to output the audio.

Also, the TS demultiplexer 71, for example, can acquire decoding error information in a case of decoding in the video decoder 72 and the audio decoder 73. The TS demultiplexer 71 can supply the decoding error information to the control unit 12. Therefore, the control unit 12 can dynamically change priority order information on the basis of the decoding error information. Note that the TS demultiplexer 71 may supply priority order information based on decoding error information to the control unit 12.

In the receiving device 51 configured as above, decoding error information is supplied to the control unit 12 in the demodulation LSI 52 from the TS demultiplexer 71 in the decoder LSI 53. The control unit 12 can control the bit rate adjusting unit 13 so as to dynamically change the priority order in accordance with the decoding error information. Therefore, for example, priority order of a packet that is causing an decoding error can be changed to be high on the basis of decoding situations in the video decoder 72 and the audio decoder 73. As a result, reproduction faults can dynamically be eliminated.

In addition, in the receiving device 51, a transmission bit rate between the demodulation LSI 52 and the decoder LSI 53 can be reduced by reducing a bit rate by the bit rate adjusting unit 13. Therefore, a transmission band needed for a system configuration can be reduced.

Note that a connection specification (interface) between the demodulation LSI 52 and the decoder LSI 53 is not particularly limited. A dedicated interface or a general bus may be used. Also, a logical connection specification (interface) between the demodulation LSI 52 and the decoder LSI 53 is also not particularly limited. For example, a multiplexed stream (herein referred to as TS) may be transmitted as it is, in a standardized method, or by being packetized in a method defined by a user. Similarly, a method of transmitting priority order information supplied to the control unit 12 from the TS demultiplexer 71 is not limited.

In addition, the bit rate adjusting unit 13 is placed in the demodulation LSI 52 different from the decoder LSI 53 where the TS demultiplexer 71 is placed in the exemplary configuration in FIG. 8. However, a configuration can be employed in which the bit rate adjusting unit 13 is placed on an LSI different from the demodulation LSI 52. The bit rate adjusting unit 13 may be placed, for example, in the same LSI as the TS demultiplexer 71.

Note that the data processing device 11 in FIG. 1 has a configuration in which the high priority packet FIFO 22 and the low priority packet FIFO 23 are arranged. When there are two or more levels of priority order, the number of FIFOs to be arranged can correspond to these levels of priority order. In addition, the number of packets that can be retained by a FIFO (size of FIFO) is not limited. The number may be a fixed value or may dynamically be changed depending on an input stream, a use case, a viewing condition of a user, and the like. Also, a size of a FIFO can be different for each priority order.

In addition, a size of a FIFO can be set to zero. In this case, the FIFO with the size of zero is equivalent to not existing. For example, when a size of the high priority packet FIFO 22 is set to zero, an input packet that has been determined as a high priority packet may instantly be output without being temporarily retained. Also, when a size of the low priority packet FIFO 23 is set to zero, an input packet that has been determined as a low priority packet may instantly be discarded without being temporarily retained.

Moreover, processing performed by the output packet selecting unit 25 is not limited to the output packet selecting unit 25 determining whether a packet is retained in the high priority packet FIFO 22 or the low priority packet FIFO 23 and outputting an output packet. For example, the output packet selecting unit 25 may set an arbitrary size, and determine whether packets with a size equal to or larger than the arbitrary size are retained in the high priority packet FIFO 22 or the low priority packet FIFO 23. Thereafter, an output packet may be selected and output.

Although the high priority packet FIFO 22 and the low priority packet FIFO 23 are buffer memories (temporary storage area) aiming for first in, first out of a series of input packets, a configuration other than FIFO may also be employed for retaining an input packet. For example, the configuration can include a random access memory (RAM) for retaining an input packet. When the configuration includes a RAM, for example, an arbitrary time is set, a packet that has been stored for not longer than the arbitrary time is preferentially output, and a packet that has been stored for longer than the arbitrary time may be discarded.

Also, in the data processing device 11, an empty packet is generated and output by the empty packet generation unit 24 in order to fix an output bit rate, but the output bit rate is not limited to being fixed. When an output bit rate can be variable, the data processing device 11, for example, can be configured not to output a packet when a packet is retained neither in the high priority packet FIFO 22 nor in the low priority packet FIFO 23.

Also, a format of a multiplexed stream processed in the data processing device 11 is not limited to TS. An acceptable multiplexed stream is configured from a series of packets that includes identifiers. For example, the data processing device 11 can support formats such as MPEG-2 transport stream (stream_id), MPEG-2 program stream (stream_id), and MPEG-H MMT stream (MMTP packet_id). Here, the inside of the parentheses mentioned above indicates identifiers of packets.

Note that each processing described with reference to the flowchart mentioned above does not necessarily have to be performed in chronological order as described in the flowchart. The processing can include processing performed in parallel or individually (for example, parallel processing or processing by object). Also, a program may be processed by a single CPU, or may be distributively processed by a plurality of CPUs.

Also, the series of processing (information processing method) mentioned above can be performed by hardware or software. In a case of performing the series of processing by software, the program configuring the software is installed on a computer, a general-purpose personal computer, or the like, from a program recording medium on which the program is stored. The computer is built into dedicated hardware. The general-purpose personal computer can perform various kinds of functions by installing various programs.

Figure 9:
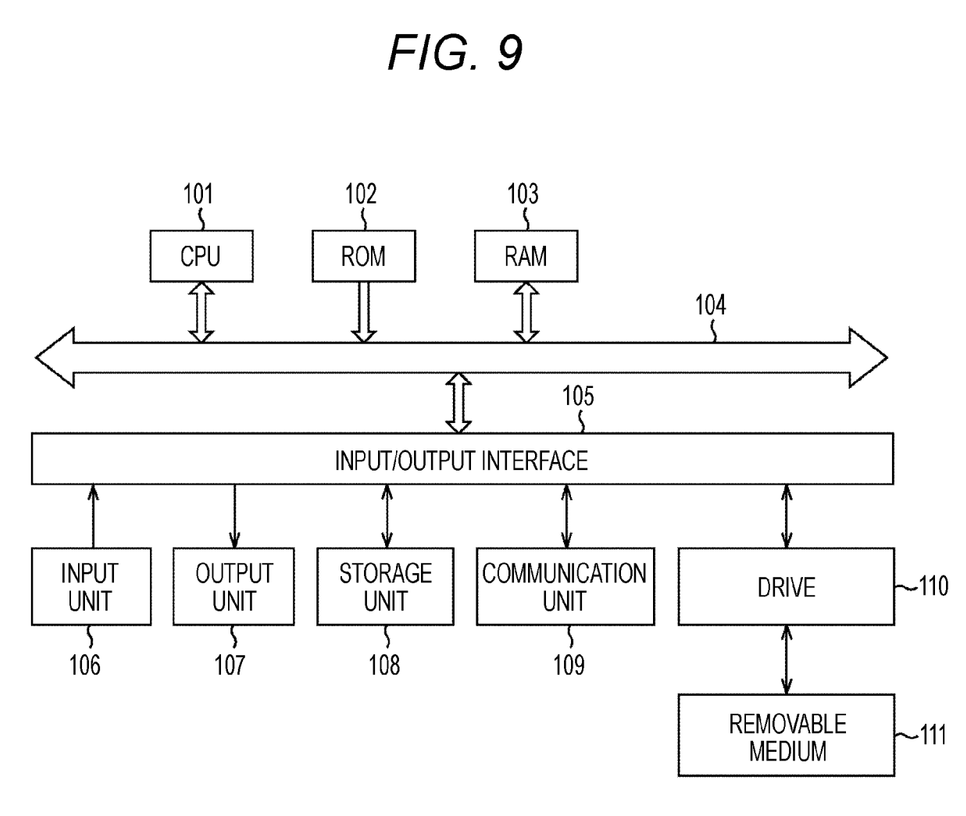
FIG. 9 is a block diagram showing an exemplary configuration of one embodiment of a computer to which the present technology is applied.

FIG. 9 is a block diagram showing an exemplary configuration of hardware of a computer that performs the series of processing mentioned above by a program.

In the computer, a central processing unit (CPU) 101, a read only memory (ROM) 102, and a random access memory (RAM) 103 are connected mutually via a bus 104.

An input/output interface 105 is further connected to the bus 104. An input unit 106, an output unit 107, a storage unit 108, a communication unit 109, and a drive 110 are connected to the input/output interface 105. The input unit 106 includes a keyboard, a mouse, a microphone, and the like. The output unit 107 includes a display, a speaker, and the like. The storage unit 108 includes a hard disk, a non-volatile memory, and the like. The communication unit 109 includes a network interface, and the like. The drive 110 drives a removable medium 111 such as a magnetic disk, an optical disk, a magneto-optic disk, or a semiconductor memory.

In the computer configured as above, the CPU 101, for example, loads a program stored in the storage unit 108 to the RAM 103 via the input/output interface 105 and the bus 104, and executes the program. Thus, the series of processing mentioned above is performed.

A program executed by the computer (CPU 101) is supplied by being recorded on, for example, the removable medium 111 as a packaged medium such as a magnetic disk (including a flexible disk), an optical disk (e.g., compact disc-read only memory (CD-ROM), a digital versatile disc (DVD)), an magneto-optic disk, and a semiconductor memory, or supplied via a wired or wireless transmission medium such as a local area network, the Internet, and digital satellite broadcasting.

Then, the program can be installed on the storage unit 108 via the input/output interface 105 by inserting the removable medium 111 into the drive 110. Alternatively, the program can be installed on the storage unit 108 by receiving the program at the communication unit 109 via a wired or wireless transmission medium. Apart from that, the program can be installed in advance on the ROM 102 or the storage unit 108.

Note that the present technology can also be configured as follows.

(1)

A data processing device including:

a classifying unit that classifies packets configuring a multiplexed stream in accordance with priority order based on data included in the packets; and a selection unit that preferentially selects and outputs the packet of the high priority order from among the packets that have been classified by the classifying unit.

(2)

The data processing device according to (1), further including a control unit that sets the priority order for the classifying unit.

(3)

The data processing device according to (2), wherein the control unit dynamically changes the priority order on the basis of a decoding error at the time of decoding data included in the packet.

(4)

The data processing device according to any one of (1) to (3), further including a retaining unit that temporarily retains the packet that is classified by the classifying unit, wherein the retaining unit is arranged in accordance with the number corresponding to the priority order, and the classifying unit causes the retaining unit corresponding to each of the priority order to retain the packet that has been classified in accordance with the priority order.

(5)

The data processing device according to any one of (1) to (4), further including an empty packet generation unit that generates an empty packet for fixing a bit rate of a stream configured from the packets output from the selection unit.

(6)

The data processing device according to any one of (1) to (5), further including a plurality of bit rate adjusting units that includes at least the classifying unit and the selection unit, wherein in the plurality of bit rate adjusting units, a bit rate is adjusted for each service included in the multiplexed stream.

(7)

A receiving device including:

a demodulation unit that demodulates broadcasting waves and acquires a multiplexed stream;

a predetermined number of packet selection units that select packets configuring each service stream for a predetermined number of services included in the multiplexed stream;

a predetermined number of bit rate adjusting units arranged for the predetermined number of packet selection units respectively and each including at least a classifying unit that classifies the packet in accordance with priority order based on data included in the packet, and a selection unit that preferentially selects and outputs the packet of the high priority order from among the packets that have been classified by the classifying unit;

a multiplexer that multiplexes a predetermined number of streams configured from packets output from the predetermined number of bit rate adjusting units;

a demultiplexer that demultiplexes the stream multiplexed by the multiplexer; and a decoding unit that decodes video and audio included in the stream demultiplexed by the demultiplexer.

(8)

A data processing method including the steps of:

classifying packets configuring a stream in accordance with priority order based on data included in the packets; and preferentially selecting and outputting the packets of the high priority order from among the packets that have been classified.

(9)

A program that causes a computer to execute data processing including the steps of:

classifying packets configuring a stream in accordance with priority order based on data included in the packets; and preferentially selecting and outputting the packets of the high priority order from among the packets that have been classified.

Note that the present embodiments are not limited to the embodiments mentioned above, and various modifications can be applied thereto as long as they do not depart from the gist of the present disclosure.

REFERENCE SIGNS LIST

11 Data processing device
12 Control unit
13 Bit rate adjusting unit
21 Input packet classifying unit
22 High priority packet FIFO
23 Low priority packet FIFO
24 Empty packet generation unit
25 Output packet selecting unit
31 Data processing device
32 PID selection unit
33 TS multiplexer
51 Receiving device
52 Demodulation LSI
53 Decoder LSI
61 Demodulation unit
71 TS demultiplexer
72 Video decoder
73 Audio decoder

The invention claimed is:

1. A data processing device comprising:
a classifying unit that classifies packets configuring a multiplexed stream in accordance with priority order based on data including the packets; and
a selection unit that preferentially selects and outputs the packet of the highest priority order from among the packets that have been classified by the classifying unit, a control unit that sets the priority order for the classifying unit,
wherein the control unit dynamically changes the priority order on the basis of a decoding error at a time of decoding data included in a corresponding packet.

2. The data processing device according to claim 1, further comprising:
a retaining unit that temporarily retains the packets that are classified by the classifying unit,
wherein the retaining unit includes a plurality of queues corresponding to respective positions in the priority order, and
the classifying unit causes the queue corresponding to each position in the priority order to retain packets that have been classified in accordance with the corresponding position in the priority order.

3. The data processing device according to claim 1, further comprising
an empty packet generation unit that generates an empty packet for fixing a bit rate of a stream configured from the packets output from the selection unit.

4. A data processing device comprising:
a classifying unit that classifies packets configuring a multiplexed stream in accordance with priority order based on data including the packets;
a selection unit that preferentially selects and outputs the packet of the highest priority order from among the packets that have been classified by the classifying unit; and
a plurality of bit rate adjusting units that includes at least the classifying unit and the selection unit, and
wherein in the plurality of bit rate adjusting units, a bit rate is adjusted for each service included in the multiplexed stream.

5. A receiving device comprising:
a demodulation unit that demodulates broadcasting waves and acquires a multiplexed stream;
a predetermined number of packet selection units that select packets configuring each service stream for a predetermined number of services included in the multiplexed stream;
a predetermined number of bit rate adjusting units arranged for the predetermined number of packet selection units respectively and each including at least a classifying unit that classifies the packet in accordance with priority order based on data included in the packet, and a selection unit that preferentially selects and outputs the packet of the high priority order from among the packets that have been classified by the classifying unit;
a multiplexer that multiplexes a predetermined number of streams configured from packets output from the predetermined number of bit rate adjusting units;
a demultiplexer that demulitplexes the stream multiplexed by the multiplexer; and
a decoding unit that decodes video and audio included in the stream demultiplexed by the demultiplexer.

6. A data processing method comprising the steps of:
classifying packets configuring a first stream in accordance with priority order based on data included in the packets;
preferentially selecting and outputting the packets of the high priority order from among the packets that have been classified; and
dynamically changing the priority order on the basis of a decoding error at a time of decoding data included in a corresponding packet.

7. The data processing method of claim 6, further comprising:
temporarily retaining the packets that have been classified,
wherein packets are retained in queues corresponding to respective positions in the priority order to which the packets have been classified.

8. The data processing method of claim 6, further comprising:
generating an empty packet for fixing a bit rate of the first stream configured from the packets output from among the packets that have been classified.

9. The data processing method of claim 6, further comprising:
adjusting a bit rate of a plurality of streams, the plurality of streams including the first stream.

10. A non-transitory computer readable medium storing a program that is executable by a processor to perform operations comprising:
classifying packets configuring a first stream in accordance with priority order based on data included in the packets;
preferentially selecting and outputting the packets of the high priority order from among the packets that have been classified; and
dynamically changing the priority order on the basis of a decoding error at a time of decoding data included in a corresponding packet.

11. The non-transitory computer readable medium of claim 10, the operations further comprising:
temporarily retaining the packets that are classified,
wherein packets are retained in queues corresponding to respective positions in the priority order to which the packets have been classified.

12. The non-transitory computer readable medium of claim 10, the operations further comprising:
generating an empty packet for fixing a bit rate of the first stream configured from the packets output from among the packets that have been classified.

13. The non-transitory computer readable medium of claim 10, the operations further comprising:
adjusting a bit rate of a plurality of streams, the plurality of streams including the first stream.

14. A data processing device comprising:
a processor; and
a memory, the memory storing program code executable by the processor to perform operations comprising:
classifying packets configuring an input stream in accordance with priority order based on data included in the packets;
preferentially selecting and outputting the packets of the high priority order from among the packets that have been classified; and
dynamically changing the priority order on the basis of a decoding error at a time of decoding data included in a corresponding packet.

15. The data processing device of claim 14, the operations further comprising:
temporarily retaining the packets that are classified,
wherein packets are retained in queues corresponding to respective positions in the priority order to which the packets have been classified.

16. The data processing device of claim 14, the operations further comprising:
discarding a packet configuring the input stream in the case that a queue is full.

17. The data processing device of claim 14, the operations further comprising:
   generating an empty packet for fixing a bit rate of an output stream configured from the packets output from among the packets that have been classified.

18. The data processing device of claim 14, the operations further comprising:
   adjusting a bit rate of a plurality of output streams, the plurality of output streams including the output stream configured from the packets output from among the packets that have been classified.

* * * * *